(12) United States Patent
Morton et al.

(10) Patent No.: US 9,031,493 B2
(45) Date of Patent: May 12, 2015

(54) CUSTOM NARRATION OF ELECTRONIC BOOKS

(75) Inventors: Michael Salomon Morton, Lyme, NH (US); Abraham Phelps Murray, Scituate, MA (US)

(73) Assignee: Google Inc., Mountain View, CA (US)

( * ) Notice: Subject to any disclaimer, the term of this patent is extended or adjusted under 35 U.S.C. 154(b) by 466 days.

(21) Appl. No.: 13/299,474

(22) Filed: Nov. 18, 2011

(65) Prior Publication Data
US 2013/0130216 A1    May 23, 2013

(51) Int. Cl.
*G09B 5/06* (2006.01)
(52) U.S. Cl.
CPC ...................... *G09B 5/062* (2013.01)
(58) Field of Classification Search
CPC .......... G09B 5/00; G09B 5/062; G10L 15/04; G10L 15/05
USPC ......................................... 434/308, 317, 319
See application file for complete search history.

(56) References Cited

U.S. PATENT DOCUMENTS

| | | | |
|---|---|---|---|
| 4,820,167 A | 4/1989 | Nobles et al. | |
| 4,985,697 A | 1/1991 | Boulton | |
| 5,392,387 A | 2/1995 | Fitzpatrick et al. | |
| 5,463,725 A | 10/1995 | Henckel et al. | |
| 5,877,765 A | 3/1999 | Dickman et al. | |
| 5,893,132 A | 4/1999 | Huffman et al. | |
| 6,122,647 A | 9/2000 | Horowitz et al. | |
| 6,154,757 A | 11/2000 | Krause et al. | |
| 6,178,431 B1 | 1/2001 | Douglas | |
| 6,181,344 B1 | 1/2001 | Tarpenning et al. | |
| 6,340,967 B1 | 1/2002 | Maxted | |
| 6,438,564 B1 | 8/2002 | Morton et al. | |
| 6,590,568 B1 | 7/2003 | Astala et al. | |
| 6,704,733 B2 | 3/2004 | Clark et al. | |
| 6,957,233 B1 | 10/2005 | Beezer et al. | |
| 6,980,652 B1 | 12/2005 | Braitberg et al. | |
| 7,007,034 B1 | 2/2006 | Hartman et al. | |

(Continued)

FOREIGN PATENT DOCUMENTS

| | | |
|---|---|---|
| EP | 1205898 A2 | 5/2002 |
| JP | 2004-258932 A | 9/2004 |

(Continued)

OTHER PUBLICATIONS

Office Action for U.S. Appl. No. 13/171,130, Jan. 5, 2012, 22 Pages.

(Continued)

*Primary Examiner* — Bruk Gebremichael
(74) *Attorney, Agent, or Firm* — Fenwick & West LLP

(57) ABSTRACT

A system and method are disclosed for correlating an electronic book with a narration. A correlation is determined between a first portion of the narration and a first segment of the text within the electronic book. The correlation is stored as instructions to present the first segment of the text with emphasis simultaneously with playback of the first the portion of the narration. A determination is made that a second portion of the audio recording, immediately following the first portion, does not match a second segment of the text that immediately follows the first segment. A correlation between the second portion and a component of the electronic book is determined and stored as instructions to present the component with emphasis simultaneously with playback of the second portion of the narration.

25 Claims, 7 Drawing Sheets

(56) References Cited

U.S. PATENT DOCUMENTS

| | | |
|---|---|---|
| 7,058,902 B2 | 6/2006 | Iwema et al. |
| 7,117,231 B2 | 10/2006 | Fischer et al. |
| 7,210,107 B2 | 4/2007 | Wecker et al. |
| 7,270,546 B1 * | 9/2007 | Adams et al. .................. 434/178 |
| 7,412,643 B1 | 8/2008 | Fischer et al. |
| 7,496,856 B2 | 2/2009 | Beezer et al. |
| 7,546,524 B1 | 6/2009 | Bryar et al. |
| 7,748,634 B1 | 7/2010 | Zehr et al. |
| 7,779,347 B2 | 8/2010 | Christiansen et al. |
| 7,793,233 B1 | 9/2010 | Sellers et al. |
| 7,873,588 B2 | 1/2011 | Sareday et al. |
| 8,131,647 B2 | 3/2012 | Siegel et al. |
| 8,239,574 B2 | 8/2012 | Keum et al. |
| 8,245,156 B2 | 8/2012 | Mouilleseaux et al. |
| 8,433,431 B1 | 4/2013 | Master et al. |
| 8,478,662 B1 | 7/2013 | Snodgrass et al. |
| 8,504,369 B1 | 8/2013 | Chigier et al. |
| 8,527,859 B2 | 9/2013 | Henshall et al. |
| 8,548,618 B1 | 10/2013 | Story et al. |
| 8,904,304 B2 | 12/2014 | Farago |
| 2002/0054073 A1 | 5/2002 | Yuen |
| 2002/0082939 A1 | 6/2002 | Clark et al. |
| 2002/0087560 A1 | 7/2002 | Bardwell |
| 2002/0091793 A1 | 7/2002 | Sagie |
| 2002/0099552 A1 | 7/2002 | Rubin et al. |
| 2002/0120635 A1 | 8/2002 | Joao |
| 2002/0184189 A1 | 12/2002 | Hay et al. |
| 2003/0013073 A1 | 1/2003 | Duncan et al. |
| 2003/0203343 A1 | 10/2003 | Milner |
| 2003/0206189 A1 | 11/2003 | Demello et al. |
| 2004/0109026 A1 | 6/2004 | Kessenich et al. |
| 2004/0162846 A1 | 8/2004 | Nakahara et al. |
| 2004/0175095 A1 | 9/2004 | Freeman |
| 2004/0201633 A1 | 10/2004 | Barsness et al. |
| 2004/0205568 A1 | 10/2004 | Breuel et al. |
| 2004/0267527 A1 | 12/2004 | Creamer et al. |
| 2005/0022113 A1 | 1/2005 | Hanlon |
| 2005/0097007 A1 | 5/2005 | Alger et al. |
| 2005/0132281 A1 | 6/2005 | Pan et al. |
| 2005/0154760 A1 | 7/2005 | Bhakta et al. |
| 2005/0193330 A1 | 9/2005 | Peters |
| 2006/0053364 A1 | 3/2006 | Hollander et al. |
| 2006/0085767 A1 | 4/2006 | Hinckley et al. |
| 2006/0114757 A1 | 6/2006 | Theimer et al. |
| 2006/0149781 A1 | 7/2006 | Blankinship |
| 2006/0182345 A1 | 8/2006 | Geidl et al. |
| 2006/0194181 A1 * | 8/2006 | Rosenberg .................. 434/317 |
| 2007/0055926 A1 | 3/2007 | Christiansen |
| 2007/0083906 A1 | 4/2007 | Welingkar |
| 2007/0118794 A1 | 5/2007 | Hollander et al. |
| 2007/0136657 A1 | 6/2007 | Blumenthal |
| 2007/0150801 A1 | 6/2007 | Chidlovskii et al. |
| 2007/0180392 A1 | 8/2007 | Russo |
| 2007/0300260 A1 | 12/2007 | Holm et al. |
| 2008/0005656 A1 | 1/2008 | Pang et al. |
| 2008/0027726 A1 | 1/2008 | Hansen et al. |
| 2008/0066185 A1 | 3/2008 | Lester et al. |
| 2008/0141182 A1 | 6/2008 | Barsness et al. |
| 2008/0168073 A1 | 7/2008 | Siegel et al. |
| 2008/0189328 A1 | 8/2008 | Sareday et al. |
| 2008/0222552 A1 | 9/2008 | Batarseh et al. |
| 2008/0229182 A1 | 9/2008 | Hendricks et al. |
| 2008/0229190 A1 | 9/2008 | Johnson |
| 2008/0231610 A1 | 9/2008 | Hotelling et al. |
| 2008/0243991 A1 | 10/2008 | Ryan et al. |
| 2008/0293450 A1 | 11/2008 | Ryan et al. |
| 2008/0294674 A1 | 11/2008 | Reztlaff et al. |
| 2008/0317346 A1 | 12/2008 | Taub |
| 2008/0320579 A1 | 12/2008 | Rollins et al. |
| 2009/0047647 A1 | 2/2009 | Welch et al. |
| 2009/0049077 A1 | 2/2009 | Lawlor |
| 2009/0125413 A1 | 5/2009 | Le Chevalier et al. |
| 2009/0187842 A1 | 7/2009 | Collins et al. |
| 2009/0240671 A1 | 9/2009 | Torres et al. |
| 2009/0254802 A1 | 10/2009 | Campagna et al. |
| 2009/0287604 A1 | 11/2009 | Korgav et al. |
| 2009/0300539 A1 | 12/2009 | Hendricks |
| 2010/0017701 A1 | 1/2010 | Bargeron et al. |
| 2010/0050064 A1 | 2/2010 | Liu et al. |
| 2010/0088746 A1 | 4/2010 | Kota |
| 2010/0161653 A1 | 6/2010 | Krasnow |
| 2010/0210203 A1 | 6/2010 | Kandelar |
| 2010/0185932 A1 | 7/2010 | Coffman et al. |
| 2010/0214216 A1 | 8/2010 | Nasiri et al. |
| 2010/0262659 A1 | 10/2010 | Christiansen et al. |
| 2010/0274864 A1 | 10/2010 | Jalili |
| 2010/0278453 A1 | 11/2010 | King et al. |
| 2010/0315359 A1 | 12/2010 | Seong et al. |
| 2010/0324709 A1 | 12/2010 | Starmen |
| 2010/0324895 A1 | 12/2010 | Kurzweil et al. |
| 2011/0029435 A1 | 2/2011 | Ronen et al. |
| 2011/0050591 A1 | 3/2011 | Kim et al. |
| 2011/0050594 A1 | 3/2011 | Kim et al. |
| 2011/0055760 A1 | 3/2011 | Drayton et al. |
| 2011/0087955 A1 | 4/2011 | Ho et al. |
| 2011/0106970 A1 | 5/2011 | Song et al. |
| 2011/0153047 A1 | 6/2011 | Cameron et al. |
| 2011/0153330 A1 | 6/2011 | Yazdani et al. |
| 2011/0163944 A1 | 7/2011 | Bilbrey et al. |
| 2011/0177481 A1 | 7/2011 | Haff et al. |
| 2011/0184960 A1 | 7/2011 | Delpha et al. |
| 2011/0195388 A1 | 8/2011 | Henshall et al. |
| 2011/0202606 A1 | 8/2011 | Agarwal et al. |
| 2011/0208614 A1 | 8/2011 | Tom |
| 2011/0227949 A1 | 9/2011 | Kung et al. |
| 2011/0231474 A1 | 9/2011 | Locker et al. |
| 2011/0246175 A1 | 10/2011 | Yi et al. |
| 2011/0252415 A1 | 10/2011 | Ricci |
| 2011/0261030 A1 | 10/2011 | Bullock |
| 2011/0288862 A1 | 11/2011 | Todic |
| 2011/0289444 A1 | 11/2011 | Winsky |
| 2012/0001844 A1 | 1/2012 | Auguste et al. |
| 2012/0019400 A1 | 1/2012 | Patel et al. |
| 2012/0030022 A1 | 2/2012 | Ajima |
| 2012/0046947 A1 | 2/2012 | Fleizach |
| 2012/0066581 A1 | 3/2012 | Spalink |
| 2012/0077175 A1 | 3/2012 | Levisay et al. |
| 2012/0096094 A1 | 4/2012 | So et al. |
| 2012/0102395 A1 | 4/2012 | Cho et al. |
| 2012/0110429 A1 | 5/2012 | Tzonis et al. |
| 2012/0113019 A1 | 5/2012 | Anderson |
| 2012/0147055 A1 | 6/2012 | Pallakoff et al. |
| 2012/0151397 A1 | 6/2012 | Oberstein et al. |
| 2012/0204092 A1 | 8/2012 | Stoner et al. |
| 2012/0210203 A1 | 8/2012 | Kandekar et al. |
| 2012/0210269 A1 | 8/2012 | Yonemoto |
| 2012/0221968 A1 | 8/2012 | Patterson et al. |
| 2012/0231441 A1 | 9/2012 | Parthasarathy et al. |
| 2012/0233539 A1 | 9/2012 | Reed |
| 2012/0233552 A1 | 9/2012 | Chee et al. |
| 2012/0235946 A1 | 9/2012 | Zotov et al. |
| 2012/0240025 A1 | 9/2012 | Migos et al. |
| 2012/0245721 A1 | 9/2012 | Story et al. |
| 2012/0246343 A1 | 9/2012 | Story et al. |
| 2012/0284348 A1 | 11/2012 | Rothschild |
| 2012/0303643 A1 | 11/2012 | Lau |
| 2012/0310642 A1 | 12/2012 | Cao et al. |
| 2012/0310649 A1 | 12/2012 | Cannistraro et al. |
| 2012/0311438 A1 | 12/2012 | Cranfill et al. |
| 2012/0311509 A1 | 12/2012 | Maggiotto et al. |
| 2013/0013991 A1 | 1/2013 | Evans |
| 2013/0041747 A1 | 2/2013 | Anderson et al. |
| 2013/0041978 A1 | 2/2013 | Ohashi |
| 2013/0080471 A1 | 3/2013 | Forte et al. |
| 2013/0080968 A1 | 3/2013 | Hanson et al. |
| 2013/0130216 A1 | 5/2013 | Morton et al. |
| 2013/0151974 A1 | 6/2013 | Cho et al. |
| 2013/0174031 A1 | 7/2013 | Constantinou |

(56) References Cited

U.S. PATENT DOCUMENTS

| | | |
|---|---|---|
| 2013/0191708 A1 | 7/2013 | Song |
| 2014/0033030 A1 | 1/2014 | Pfister |

FOREIGN PATENT DOCUMENTS

| | | |
|---|---|---|
| JP | 2005-189906 A | 7/2005 |
| KR | 10-2011-0049981 A | 5/2001 |
| KR | 10-2002-0002102 A | 1/2002 |
| KR | 10-2002-0006129 A | 1/2002 |
| KR | 10-2003-0000244 A | 1/2003 |
| KR | 10-2005-0108231 A | 11/2005 |
| KR | 2006-0001392 A | 1/2006 |
| KR | 10-06952090 B1 | 3/2007 |
| KR | 10-2008-0020122 A | 3/2008 |
| KR | 2009-0117965 A | 11/2009 |
| KR | 10-2010-0020246 A | 2/2010 |
| KR | 2010-0128068 A | 12/2010 |
| KR | 10-2011-0001105 A | 1/2011 |
| WO | WO 2007/099529 A1 | 9/2007 |
| WO | WO 2012/115853 A2 | 8/2012 |

OTHER PUBLICATIONS

Office Action for U.S. Appl. No. 13/182,797, Jun. 4, 2012, 23 Pages.
PCT International Search Report and Written Opinion, PCT/US2012/025467, Jan. 2, 2013, 7 pages.
Office Action for U.S. Appl. No. 13/280,197, Oct. 15, 2012, 13 Pages.
Office Action for U.S. Appl. No. 13/171,130, Nov. 23, 2012, 21 Pages.
Office Action for U.S. Appl. No. 13/182,797, Nov. 28, 2012, 22 Pages.
Office Action for U.S. Appl. No. 13/182,809, Jan. 25, 2013, 13 Pages.
Office Action for U.S. Appl. No. 13/103,813, Oct. 15, 2012, 20 Pages.
Office Action for U.S. Appl. No. 13/182,733, Jan. 30, 2013, 13 Pages.
Marshall, C., et al., "Turning the Page on Navigation," JDCL'05, Jun. 7-11, 2005, pp. 225-234.
Fenwick, J., et al., "Teaching Mobile Computing and Developing Software to Support computer Science Education," SIGCSE,'11, ACM Mar. 9-12, 2011, pp. 589-594.
Hamalainen, M., et al., "Electronic Markets for Learning: Education Brokerages on the Internet," Communications of the ACM, Jun. 1996, vol. 39, No. 6.
Parke, F., "Interactive Tools to Support Animation Tools," Computer Graphics Laboratory, New York Institute of Technology, ACM, 1986, pp. 89-91.
PCT International Search Report and Written Opinion, PCT/US2012/051643, Mar. 13, 2013, 9 Pages.
PCT International Search Report and Written Opinion, PCT/US2012/052622, Feb. 19, 2013, 9 Pages.
PCT International Search Report and Written Opinion, PCT/US2013/023683, May 13, 2013, 10 Pages.
PCT International Search Report and Written for PCT/US2013/056337, Nov. 26, 2013, 9 Pages.
Kara, et al., "Hierarchical Parsing and Recognition of Hand-Sketched Diagrams," ACM, 2004, pp. 13-22.
Liao, C., et al., "PapierCraft: A Gesture-Based Command System for Interactive Paper," ACM Transactions on Computer-Human Interaction, Jan. 2008, pp. 18:1-18:27, vol. 14, No. 4, Article 18.
National Information Standards Organization, Specifications for the Digital Talking Book, Apr. 21, 2005, 93 Pages, Can be retrieved from the internet <URL:http://www.niso.org/workrooms/daisy/Z39-86/2005.pdf>.
Dolphin Computer Access Ltd., EasePublisher, Version 2.1, 2007, 288 Pages, Can be retrieved from the internet <URL:http://www.yourdolphin.com/manuals/044FMANP210.pdf>.
Shinano Kenshi Co., Ltd., Plextalk Recording Software User Manual, Jul. 2004, 70 Pages, [online] [Retrieved on Oct. 28, 2013] Retrieved from the internet <URL:http://www.plextalk.com/in/download/PLEX_IRS_UM_Ehtml>.
American Printing House for the Blind Inc., Book Wizard Producer User's Manual, Sep. 7, 2010, 41 Pages, Can be retrieved from the internet <URL:http://tech.aph.org/bwp_info.htm>.
The World Wide Web Consortium (W3C), Synchronized Multimedia Integration Language (SM IL 2.1), Dec. 13, 2005, 471 Pages, Can be retrieved from the internet <URL:http://www.w3.org/TR/2005/REC-SMIL2-20051213/>.
PCT International Search Report and Written Opinion, PCT Application No. PCT/US2012/023628, Aug. 22, 2012, 9 pages.
PCT International Search Report and Written Opinion, PCT Application No. PCT/US2012/023584, Sep. 25, 2012, 9 pages.
PCT International Search Report and Written Opinion, PCT Application No. PCT/US2012/025438, Sep. 19, 2012, 12 pages.
PCT International Search Report and Written Opinion, PCT Application No. PCT/US2012/025443, Sep. 10, 2012, 11 pages.
PCT International Search Report and Written Opinion, PCT Application No. PCT/US2012/023599, Sep. 10, 2012, 9 pages.
United States Office Action, U.S. Appl. No. 13/182,809, Jun. 26, 2012, 12 pages.
United States Office Action, U.S. Appl. No. 13/171,130, Jun. 22, 2012, 20 pages.
amazon.com, Inc., Amazon Kindle User's Guide $4^{th}$ Edition, 2004-2011, pp. 1-120, can be retrieved at <URL:http://kindle.s3.amazonaws.com/Kindle_User's_Guide_4th_Edition.pdf>.
BBC, "Bitesize Book Notes—Give You Brain a Boost," BBC—Book Notes, 2012, 1 page, [online] [retrieved on Apr. 23, 2012] Retrieved from the internet <URL:http://www.bbc.co.uk/schools/gcsebitesize/booknotes/>.
BBC, "Subtext," BBC—Learning Development, 1 page, [online] [retrieved on Apr. 23, 2012] Retrieved from the internet <URL:http://www.bbcattic.org/learningdevelopment/projects_subtext.shtml>.
Damm, D., et al., "SyncTS: Automatic synchronization of speech and text documents," AES $42^{nd}$ International Conference, Ilmenau, Germany, Jul. 22-24, 2011, pp. 1-10.
Koolen, C., et al., "Electronic Environments for Reading: An Annotated Bibliography of Pertinent Hardware and Software (2011)," 95 Pages.
Landoni, M., "Evaluating E-books," BooksOnline'10, Oct. 26, 2010, pp. 43-46.
Landoni, M., "The Active Reading Task: E-books and their Readers," BooksOnline'08, Oct. 30, 2008, ACM, pp. 33-36.
Lei, D., "Define, translate and search for words in Google eBooks," Google Books Search, Google Inc., May 19, 2011, 3 pages, [online] [retrieved on Apr. 23, 2012] Retrieved from the internet <URL:http://booksearch.blogspot.com/2011/05/define-translate-and-search-for-words.html>.
Mickey, K., et al., "E-Textbooks in Higher Education," Simba Information, 2010, 69 Pages.
Murray, A., "Discover more than 3 million Google eBooks from your choice of booksellers and devices," Google Books Search, Google Inc., Dec. 6, 2010, 2 pages, [online] [retrieved on Apr. 23, 2012] Retrieved from the internet <URL:http://booksearch.blogspot.com/2010/12/discover-more-than-3-million-google.html>.
Neary, L., "Children's Book Apps: A New World of Learning," NPR, Mar. 28, 2011, 3 pages, can be retrieved at <URL:http://www.npr.org/2011/03/28/134663712/childrens-book-apps-a-new-world-of-learning>.
Ribiére, M., et al., "The sBook: towards Social and Personalized Learning Experiences," BooksOnline'10, Oct. 26, 2010, ACM, 6 pages, can be retrieved at <URL:http://research.microsoft.com/en-us/events/booksonline10/ribiere-etal.pdf>.
Robinson, J., et al., "Using Linked Data to Reduce Learning Latency for e-Book Readers," ESWC 2011 Workshops, LNCS 7117, 2012, pp. 28-34.
Socialtext, Inc., "Socialtext 5.0 Features," 2012, 2 pages, [online] [retrieved on Apr. 23, 2012] Retrieved from the internet <URL:http://www.socialtext.com/features/>.
Subtext, "Subtext User Guide," 2011, 44 pages, can be retrieved at <URL:http://www.subtext.com/downloads/Subtext-User-Guide.pdf>.

(56) References Cited

OTHER PUBLICATIONS

Vignoli, F., et al., "A Text-Speech Synchronization Technique with Applications to Talking Heads," ISCA Archive, Auditory-Visual Speech Processing, Aug. 7-10, 1999, 5 Pages.

Webpage for Whatever.com, 2011, 1 page, [online] [retrieved on Aug. 31, 2011] retrieved from the internet <URL: http://www.whatever.com/>.

Wilson, R., et al., "The WEB Book experiments in electronic textbook design," Journal of Documentation, 2003, pp. 454-477, vol. 59, No. 4.

ZiiLABS, "Creative Patents Found for "Drag and Drop" on Touchscreen Devices, Revealing Tabbed Web Browsing," Tech in Hiding, Aug. 7, 2009, 6 pages, [online] [retrieved on Jul. 18, 2011] Retrieved from the internet <URL: http://creative.techinhiding.com/2009/08/creative-patents-found-for-drag-and-drop-on-touchscreen-devices-suggesting-multi-tab-web-browsing/>.

PCT International Search Report and Written Opinion for PCT/US2013/025432, Aug. 27, 2013, 8 Pages.

PCT International Search Report and Written Opinion for PCT/US2012/025339, Aug. 27, 2013, 12 Pages.

United States Office Action for U.S. Appl. No. 13/182,773, Dec. 23, 2014, 9 pages.

United States Office Action for U.S. Appl. No. 13/171,130, Sep. 25, 2014, 25 pages.

United States Office Action for U.S. Appl. No. 13/103,813, Oct. 1, 2014, 17 pages.

United States Office Action for U.S. Appl. No. 13/182,797, Sep. 19, 2014, 18 pages.

United States Office Action for U.S. Appl. No. 13/620,346, Oct. 17, 2014, 12 pages.

Gibron B., "The Simpsons—The Complete Fifth Season", DVD Talk, Dec. 21, 2004, pp. 1-7.

European Extended Search Report, European Application No. 12842720.0 Mar. 19, 2015, 7 pages.

\* cited by examiner

CUSTOM NARRATION OF ELECTRONIC BOOKS

BACKGROUND

1. Field of Invention

The disclosure generally relates to the field of electronic books, and more specifically to the creation of custom synchronized narrations for electronic books.

2. Background Information

For many years audio books have been available for people who are blind or visually impaired, or just prefer to listen to a book as opposed to reading it themselves. With the rapid development of electronic books, the interest in audio narration has grown rapidly as well. Electronic book readers implemented either as use-specific devices, or as software on personal computers, tablet computers and smartphones have allowed the scope of what constitutes a book to be expanded.

Children can now learn to read with the aid of book readers that automatically generate audio narrations using text-to-speech software. Visual indicia can be automatically provided (such as the classic "karaoke bouncing ball") to aid children in reading along with a narrator. Electronic book readers can also be programmed to provide interactive content, encouraging a child to take an active part in learning to read.

While prior art systems exist for parents to record their own narrations to electronic books (for example, see U.S. patent application Ser. No. 12/687,240), there are no known systems that conveniently allow a narrator to customize their narration to include content not from the original text.

SUMMARY

A system, method and computer readable storage medium is disclosed for creating a custom narration of a book. In one aspect, a recording is made of a narrator reading a subset of the book aloud and portions of the narration are correlated with segments of the book's body text and components of the book. The correlations are stored such that upon playback, the portions can be presented as corresponding to the segments and components. In related aspects the portions and segments are individual words and/or syllables. In further related aspects, the correlations are stored by adding metadata to the recording and/or writing correlation data to a correlation file. In yet another related aspect, the narrator is prompted to record additional narration material for one or more specified components and correlations between the additional narration and the specified components are recorded.

In another aspect, correlations are determined and stored between a pre-recorded narration of an electronic book and components of the electronic book, including the body text, illustrations, page breaks, positions in the text, and chapter breaks. In a related aspect, additional correlations are made responsive to user input and these additional correlations overwrite those that were previously determined for the same components of the electronic book.

In a further aspect, an electronic book is presented in correlation with a narration. Segments of the text and other components of the electronic book are presented with emphasis simultaneously with portions of the narration previously determined to correlate with those segments and components. In a related aspect, the presentation of the electronic book and corresponding narration occurs at substantially the same time as a narrator initially reads the narration aloud.

BRIEF DESCRIPTION OF DRAWINGS

The disclosed embodiments have other advantages and features that will be more readily apparent from the detailed description, the appended claims, and the accompanying figures. A brief introduction of the figures is below.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed. For convenience and in order to aid readability the described embodiments and claims refer to the specific text to be narrated as an electronic book. It should be understood that this is intended to encompass all forms of digital text, including, but not limited to; electronic books, electronic magazines, electronic newspapers, and any other such entity which includes text displayed on an electronic reading device.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Computing Machine Architecture

Figure 1:
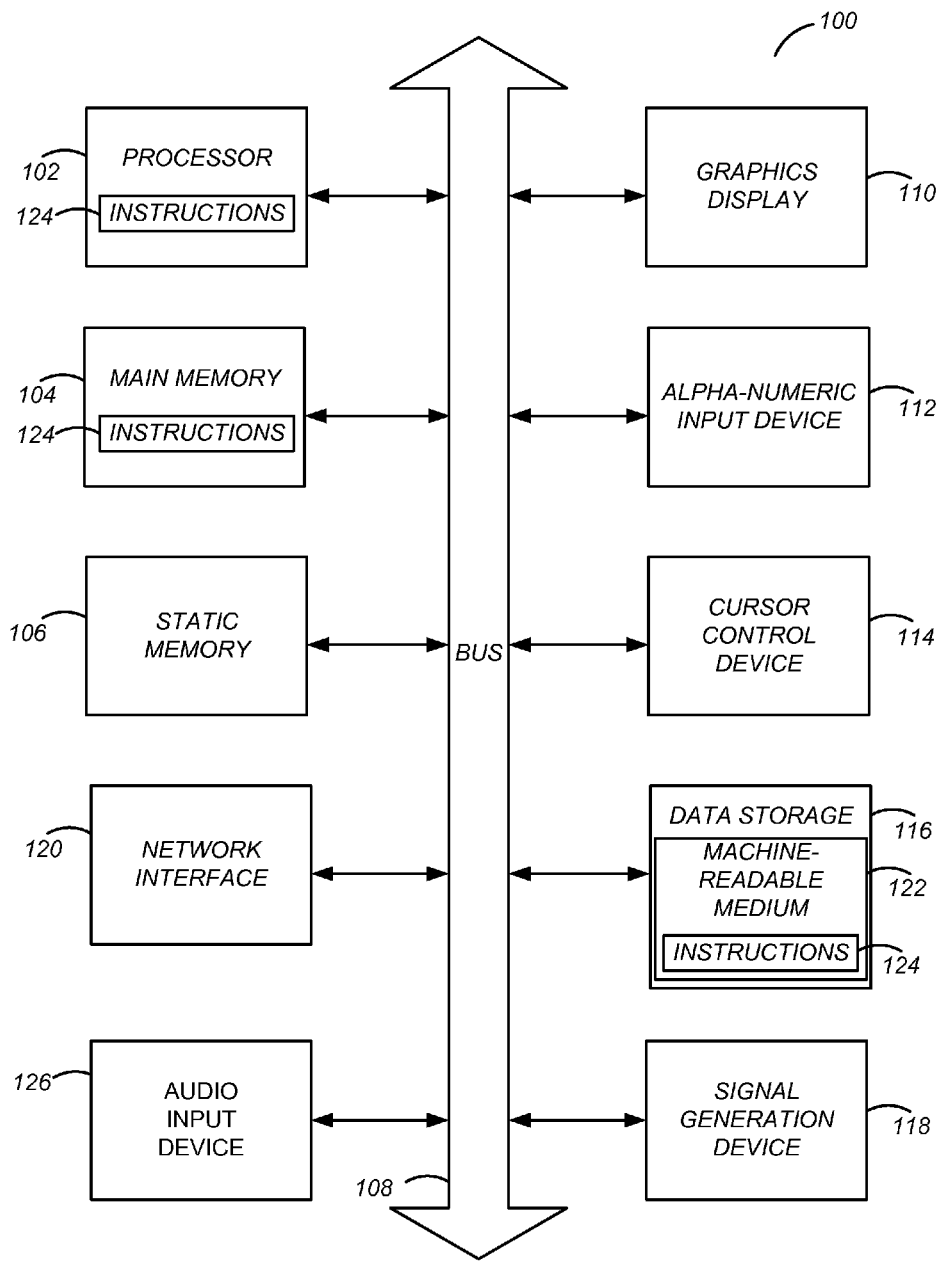
FIG. 1 illustrates one embodiment of components of an example machine able to read instructions from a machine-readable medium and execute them in a processor.

FIG. 1 is a block diagram illustrating components of an example machine able to read instructions from a machine-readable medium and execute them in a processor. Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a data store 116, a signal generation device 118 (e.g., a speaker), an audio input device 126 (e.g., a microphone) and a network interface device 820, which also are configured to communicate via the bus 108.

The data store 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network (not shown) via a network interface 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Configuration Overview

Figure 2:
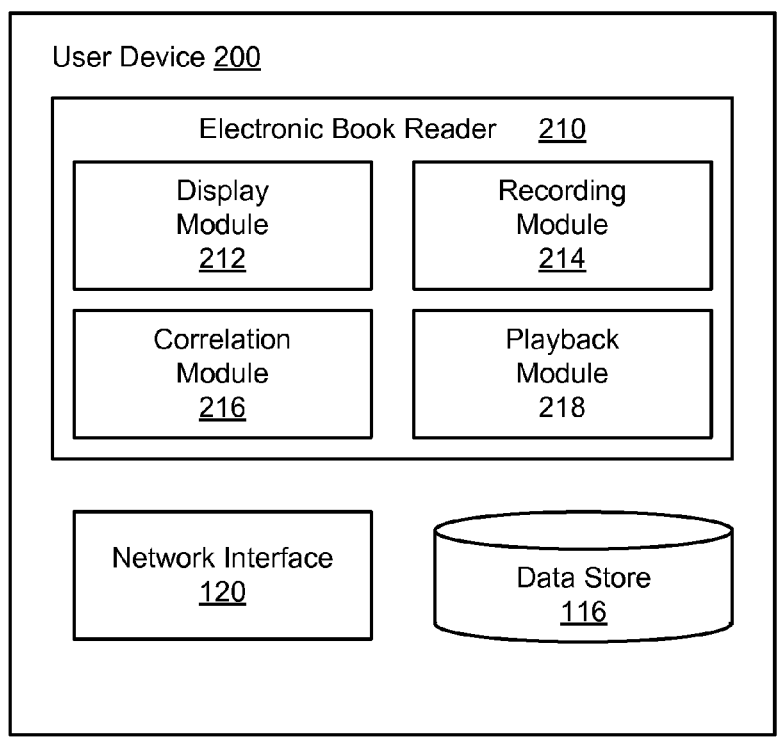
FIG. 2 is a high-level diagram illustrating a user device in accordance with one embodiment.

FIG. 2 is a high-level diagram illustrating a user device 200 configured to record and play back synchronized narrations in accordance with some embodiments. The user device 200 includes an electronic book reader 210, a network interface 120, and a data store 116. The electronic book reader 210 includes a display module 212, a recording module 214, a correlation module 216, and a playback module 218.

In one embodiment, an electronic book is obtained by a user and retained in the user device's 200 local data store 116. One method by which the electronic book is obtained is via network interface 120, which enables the user device 200 to interact with online book vendors and repositories such as GOOGLE BOOKS™ and GOOGLE EBOOKSTORE™. Alternatively, the electronic book can be copied to the data store 116 from portable computer readable media such as a FLASH™ drive, compact disc (CD) or digital versatile disc (DVD). In an alternative embodiment, the electronic book is accessed by the electronic book reader 210 directly from a remote storage source via the network interface 120.

In some environments, the synchronized narration of the electronic book is provided by the book vendor. Users either purchase the electronic book with a synchronized narration or download it later as an add-on. In this way users can choose between many different professionally recorded narrations. Synchronized narrations need not be provided by a single narrator. For example, in some instances each character in an electronic book is read by a different voice actor, with another voice actor providing the general narration.

In one embodiment, DRM is used to ensure that an electronic book reader 210 will only play a specific synchronized narration if the user has purchased the right to do so. Alternatively, a flat fee (on top of the electronic book purchase price) is charged for the right to use synchronized narrations with an electronic book. Once a user has purchased the right to incorporate synchronized narrations with a specific electronic book they can download and record as many different such narrations as they wish.

In other environments, the synchronized narration is user generated. Synchronized narrations can be recorded locally on the same device that they will ultimately be played back on, or transferred via network interface 120 to another user device 200. As an example of the first instance, a parent records a synchronized narration for a child on a user device 200 during the day and then at bedtime the child plays the narration back on the same user device 200. Alternatively, in the second instance, after recording the synchronized narration, a parent who is away from home sends it to their child via email. In one embodiment, a plurality of a child's relatives record synchronized narrations for a particular electronic book. Every time a child reads the electronic book they select which synchronized narration to listen to.

In some embodiments, user generated synchronized narrations are shared for download via the internet, either free of charge or for a price. In one such embodiment, the quality of a synchronized narration is obtained by crowd-sourcing. For example, users who have downloaded a particular synchronized narration are asked to give it a star rating out of 5. Alternatively, "+1" voting is used to determine the popularity of the synchronized narration. In a related embodiment, in cases where an electronic book is broken up into a plurality of character parts, which can be read by one or more narrators, users are able to vote on and/or rate the individual parts. Users may "mix and match" character parts from different narrations, e.g., if a first synchronized narration has a higher rating for a first character and a second synchronized narration has a higher rating for a second character, the user is given the option of downloading the higher rated readings of each character and combining them into a new synchronized narration.

In the embodiment illustrated in FIG. 2, the electronic book reader 210 is software running on the user device 200 that configures the user device 200 to display and manipulate electronic books stored as one or more data files in the local data store 116 and/or accessed via the network interface 120. The display module 212 reads electronic book data files responsive to user selection of a specific electronic book and presents the content described therein to the user on the graphics display 110 of the user device 200.

The illustrated electronic book reader 210 operates in two modes; recording and playback. In some embodiments user devices (e.g., user device 200) are configured to perform both functions. In other embodiments, these modes are provided separately with a first group of user devices configured to record synchronized narrations and a second group of user devices configured for synchronized narration playback.

In recording mode, a user of user device 200 opens an electronic book for display by the display module 212. The recording module 214 then directs the user to read the electronic book aloud. The recording module 214 records the narrator reading aloud using audio input device 126. The recording of the narrator will generally contain one or more additional utterances, corresponding to the narrator deviating from the written text, for example by repeating a word for emphasis, commenting on an illustration, misreading a word, coughing, describing a word or phrase, or in any other way in which the narrator decides to elaborate on the written text. The display module 212 is configured to automatically turn to the next page when the end of the current page is reached. In alternative embodiments, the display module waits for user input before changing page, or allows the user to toggle between automatic and manual page turning.

In a further embodiment, the recording module 214 directs the narrator to read specific segments of the electronic book for which narration is required. The order in which the narrator is directed to read the segments of the electronic book need not make sense to the narrator, but nevertheless ensures a portion of narration is recorded that corresponds to every segment of text.

The correlation module 216 compares the recording of the narrator to the digital text of the electronic book and correlates portions of the recording with segments of the digital text. The correlation module 216 also determines which portion(s) of the recording correspond to additional utterances made by the narrator. The correlation module 216 then determines correlations between each additional utterance and a corresponding component of the electronic book. Components to which an additional utterance can correspond include illustrations, page breaks, chapter breaks, portions of digital text, and positions in the digital text. This may be implemented in a variety of ways.

For example, in one embodiment correlations between components and additional utterances are determined by a logical analysis of the electronic book, the recording of the narrator, and any previously determined correlations (e.g., correlating an additional utterance to an illustration is favored over other possible correlations if the additional utterance is identified to include a key-word such as, "see", "look", "picture", or "drawing"). In another embodiment the narrator is asked to manually assign additional utterances to components after the recording of the narration is complete. In a further embodiment that combines the two previous methods, a logical analysis is used to determine likely correlations between each additional utterance and a component of the electronic book and the narrator is prompted to confirm or override each correlation.

In one embodiment the recording of the narrator is made by the recording module 214 and the correlation data determined by the correlation module 216 are stored in data store 116 for later access by the playback module 218. In another embodiment, the recording of the narrator and the correlation data are sent to an online repository, such as a cloud server, using the network interface 120.

The correlation data and the recording of the narrator are stored in a manner which enables the playback module 218 to be aware of the association between them. For example, in one embodiment the correlation data is stored as time-stamp metadata within an audio file containing the recording of the narrator. In another embodiment, the correlation data is stored as a separate file in the same directory as the file containing the recording, with the same file name but a different file extension. In yet another embodiment, the recording and correlation data are stored in independent files and the correlation module 216 creates a resource association file which informs the playback module 218 where to find all the data required.

When operating in playback mode, a user of user device 200 opens an electronic book for which a synchronized narration has previously been recorded. The display module 212 displays the electronic book and the playback module 218 loads the narration and correlation data. Responsive to user input, the playback module 218 plays the synchronized narration back. The playback module 218 interacts with the display module 212 to provide visual indicia of the correlations stored in the correlation data. For example, in one embodiment, the display module 212 highlights each word as it is played back. When an additional utterance is played back, the component that was previously determined to correspond to the additional utterance is highlighted. In another embodiment a karaoke style bouncing ball performs the same function. One of skill in the art will readily recognize that many such forms of visual indicia are possible without deviating from the spirit or scope of this disclosure.

The embodiments described above have recording and playback occurring separately, but this is not a requirement. In some embodiments, the correlation data and recording of the narrator are sent in real time to a playback module 218 of a second user device (not shown), via the network interface 120. In this manner, synchronized narration playback with visual indicia generated from the corresponding correlation data occurs substantially in real time. Alternatively, the correlation data is used by the display module 212 of user device 200 to generate visual indicia in real time, in which case playback of the recording is not required. One exemplary use of this is a parent reading a book to a child, with the electronic book reader 210 automatically providing a visual indication of the segment of the book being read to help the child "read along."

Systems and methods by which the above functionality can be provided are described in greater detail below with reference to specific embodiments.

Narration Recording

Figure 3:
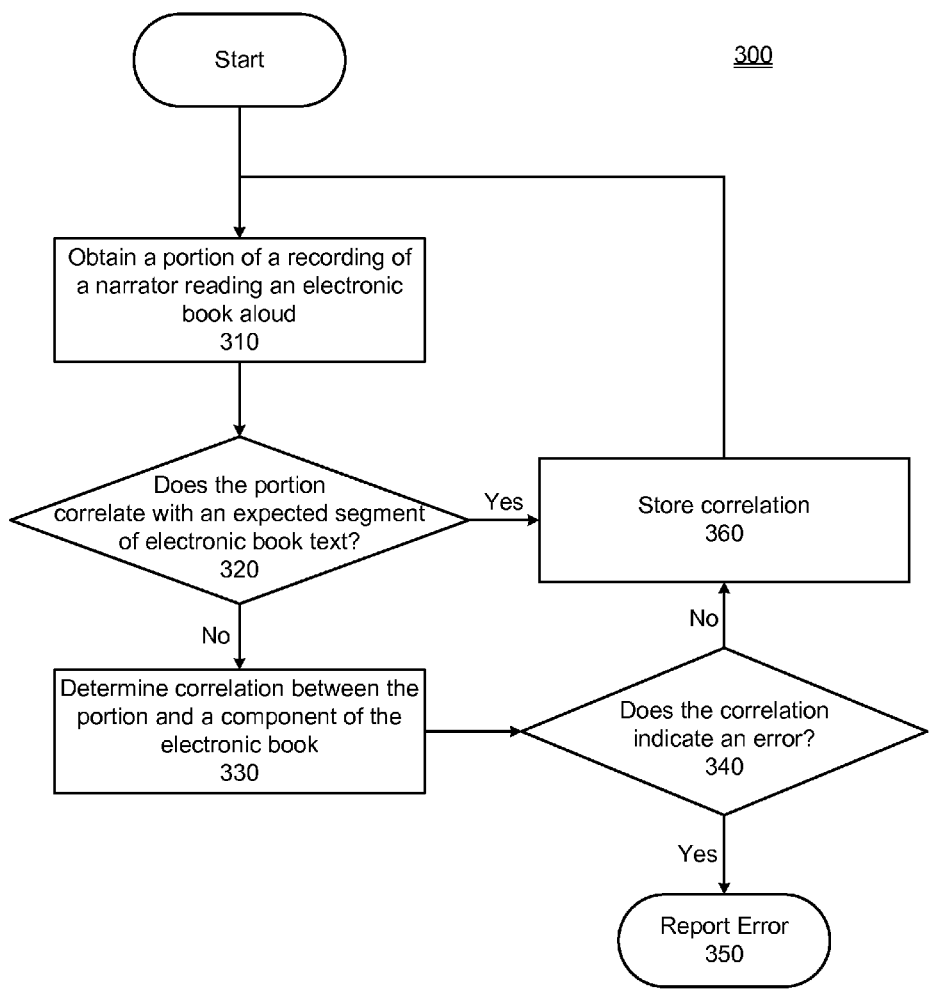
FIG. 3 is a flow chart illustrating a method for creating a synchronized narration in one embodiment.

FIG. 3 is a flow chart illustrating the high-level steps of a method 300, used in exemplary embodiments, for creating a synchronized narration of an electronic book. The method begins by obtaining a portion of a recording of a narrator reading an electronic book aloud (step 310). The correlation module 216 uses a speech to text algorithm to determine whether the portion correlates with an expected segment of the electronic book's body text (step 320). For example, the first portion of the recorded narration is expected to correspond to the first word (or first syllable) of the electronic book's body text. On later iterations, the portion of the recorded narration is expected to correspond to a segment of the electronic book's body text that immediately follows the last segment for which a correlation was determined. In one embodiment, correlations are found between portions and segments that are whole words. In another embodiment, correlations with the electronic book's body text are determined syllable by syllable. Specific applications may require determining correlations for coarser or finer divisions of the body text and recorded narration.

If a correlation is successfully determined between the portion and the expected segment then this correlation is stored (step 360). As described above, there are numerous ways in which the correlation can be stored. For example, as time-stamp metadata within the narration recording, or as correlation data in a separate file, with the correlation and narration recording files linked by a common file name or an entry in a resource association file.

If the portion is determined not to correlate with the expected segment, a correlation algorithm is used to determine a correlation between the portion and a component of the electronic book (step 330). In one embodiment, once a portion has been determined not to correlate with the expected segment, the correlation module 216 continues to search through portions of the audio recording of the narration until it finds a portion that does correspond with the expected segment. The correlation module 216 then combines all the portions between the previously correlated portion and the portion correlating with the expected segment into a single uncorrelated portion and runs the correlation algorithm a single time for the combined uncorrelated portion.

In some books the order in which all the text on a page is to be read may not be clear, or may even be optional. For example, books for young children often have text scattered across the page and the specific order that the text is read in is often not important. In one embodiment, the electronic book considers all the text on the page as "expected segments" when checking for correlations during step 320. In another embodiment, the electronic book contains a suggested order and if the narrator chooses a different order the correlation data generated in step 330 is used to override the suggested order. In a further embodiment, the correlation module 216 checks the previous and next pages for correlations, as a narrator that knows the electronic book well may skip ahead and back over a page break.

After determining a correlation, the result is checked for error conditions (step 340). If no error was reported the correlation is stored and the method loops back to the beginning (step 360). The method then obtains a new portion of the audio recording of the narration to correlate (step 310). In the embodiment shown the method ends if an error is reported (step 350 and the narrator must begin again. In other embodiments, the error is reported to the narrator and managed before the method returns to 310 to continue looping. Some exemplary methods for managing errors are described in further detail below with regards to FIG. 4 and specific embodiments.

In another embodiment, the narrator indicates which component of the electronic book they are narrating as they record the narration. For example, the narrator selects a paragraph by tapping it on a touch screen and then reads the paragraph aloud. The narrator then wishes to record a narration corresponding to an illustration, so they tap the illustration and then record their narration for that component.

Figure 4:
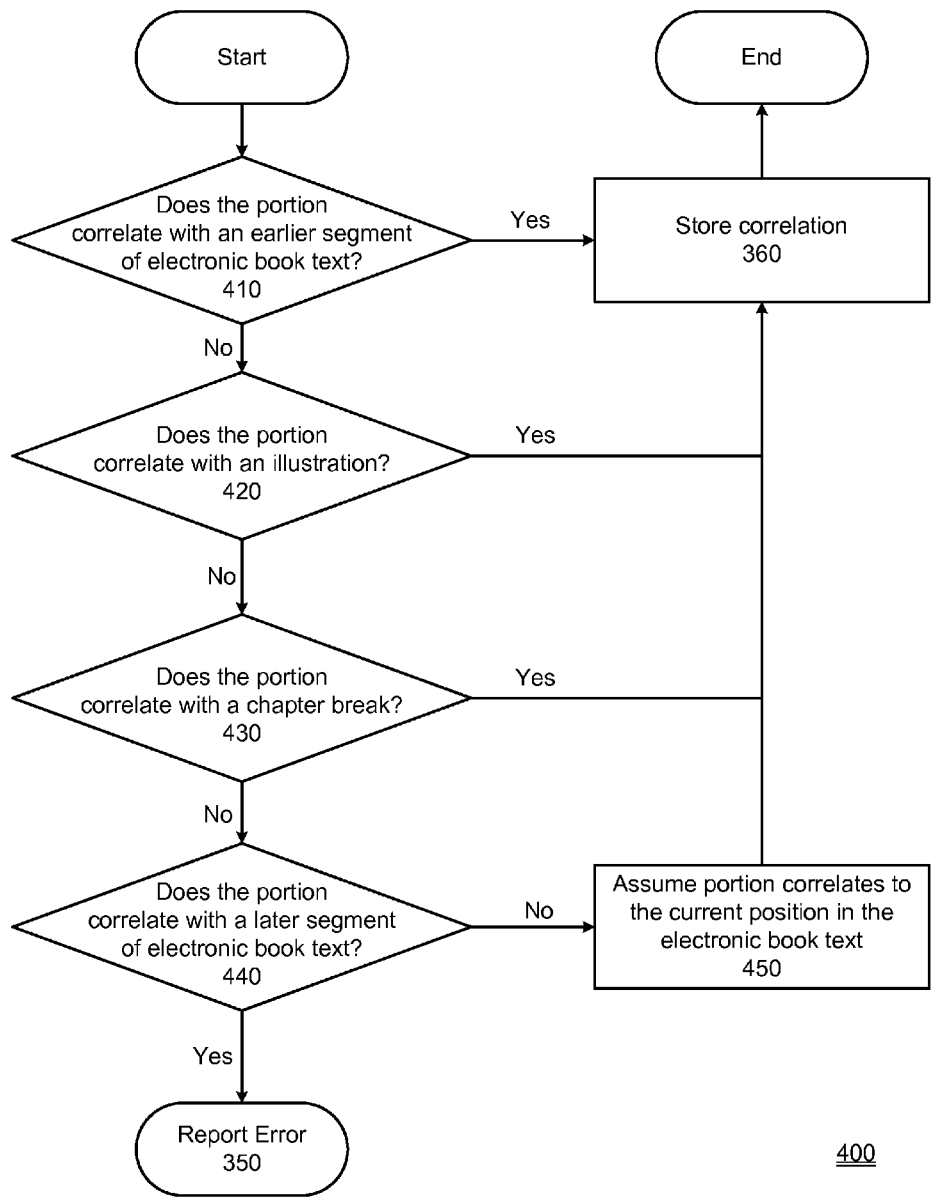
FIG. 4 is a flow chart illustrating an exemplary algorithm for correlating portions of a recorded narration with components of an electronic book, in one embodiment.

FIG. 4 illustrates an exemplary correlation algorithm 400 in one embodiment. The correlation algorithm 400 begins by determining if the portion correlates with an earlier segment of the electronic book's body text (step 410). A threshold is used to determine how far back from the current position in the text (the current position being just after the last segment of text for which a correlation was determined) to search for a segment that corresponds with the portion. For example, the narrator is likely to repeat an important word or phrase for emphasis, but it is unlikely they will jump back several pages. If a correlation is determined, the correlation is stored (step 360) and the algorithm 400 ends.

If a correlation is not determined, the algorithm 400 continues and attempts to determine a correlation between the portion and an illustration (step 420). The algorithm 400 considers the current position in the text and searches for illustrations that are spatially proximal on the electronic book page. If one or more illustrations are found, the portion is assumed to correlate with the illustration that is spatially closest to the current position. This correlation is then stored (step 360) and the algorithm 400 ends. In alternative embodiments, existing correlations between other portions and a specific illustration are also considered by the algorithm 400 in determining whether the portion correlates with the specific illustration. For example, in one such embodiment each illustration is only allowed to correlate with one portion of the audio recording of the narration.

If the portion is not determined to correlate with an illustration, the algorithm 400 continues and attempts to determine whether the portion correlates to a chapter break (step 430). This is a simple test as to whether the last segment correlated is at the end of a chapter. If a chapter break is found and thereby a correlation determined, the correlation is stored (step 360) and the algorithm 400 ends. The ability to correlate a portion of a narration with chapter breaks is likely to be of particular interest to a parent who is recording a narration for their child as "bedtime reading." The parent can record an end of chapter message such as, "That's enough for tonight, time for bed!" In some embodiments the electronic book reader 210 is configured not to allow playback to continue past such a message until a set time, e.g., the next night's bedtime. In one such embodiment a parent can override this with specific instructions, such as by entering a password.

If a correlation still has not been determined, the algorithm 400 continues and attempts to determine a correlation between the portion and a later segment of the electronic book's body text (step 440). Starting with the current position, the algorithm 400 steps forward through the text one segment at a time, checking for a correlation with the portion. A threshold value is used to determine how far ahead of the current position to search for a correlation. For example, a narrator is likely to skip a word or line, or even a whole page when traversing a page break; but they are unlikely to skip several pages.

If a correlation is determined between the portion and a later segment, then an error is reported (step 350). In some embodiments this error is reported to the narrator visually (e.g., a flashing red light) and the narrator chooses how to respond. If the narrator continues to narrate, the correlation module 216 assumes the segment was skipped intentionally, stores the correlation with the later segment (step 360), and continues to determine and store correlations from the newly determined current position. Alternatively, the narrator elects via user input to re-record the narration from a point before the skipped segment. In one such embodiment, the error condition times out if the narrator does not elect to re-record within a pre-determined time of the error being generated (e.g., 10 seconds). In other embodiments, the recording module 214 automatically stops recording and instructs the narrator to begin re-recording at a point before the skipped segment that generated the error.

If a correlation has still not been determined, the algorithm 400 assumes that the portion corresponds to the current position (step 450). For example, the narrator may have expanded on the section just read with a personal example such as, "Do you remember when we saw the lions at the zoo? They were big and scary!" or they may have described the meaning of a long or unusual word. This correlation is stored (step 360) and the algorithm ends.

In some embodiments, the display module 212 provides user interface controls for the narrator to override a determined correlation between a portion of the recorded narration and a component of the electronic book. For example, if the correlation module 216 determines that the portion corresponds to first illustration on a page, but the narrator was actually talking about a second illustration, the narrator may reassign the portion to be correlated with the second illustration. In this case, the stored correlation data is removed and replaced with the new narrator-determined correlation data. In one such embodiment, the narrator performs reassignments as part of an editing process after completing the initial narration. In another such embodiment the narrator dynamically performs reassignments during the narration process, for example by tapping the component to which the portion should correspond immediately after the incorrect correlation has been determined. In this manner, an experienced narrator can reassign incorrectly correlated portions without pausing the narration process.

In a related embodiment, controls are provided for the narrator to delete portions of the recorded narration. For example, if the narrator accidentally reads a line twice they can delete the repeated portion without having to re-record any part of the narration. In a further related embodiment, user controls are provided for the narrator to re-record portions of the recorded narration. For example, the narrator may have read the correct words in a paragraph but not be happy with the delivery of a particular sentence. The system therefore allows the narrator to replace the sentence they are not satisfied with without having to re-record the rest of the paragraph.

In other embodiments, once the narrator has completed narration of all of the body text of an electronic book, the system prompts them to record narrations for additional components such as illustrations and chapter breaks. This is particularly useful for children's books in which there are many illustrations for which a parent may wish to provide commentary. In this way, a highly interactive electronic book narration can be created in which all (or most) of the components of the electronic book have an associated narration portion.

Narration Playback

Figure 5:
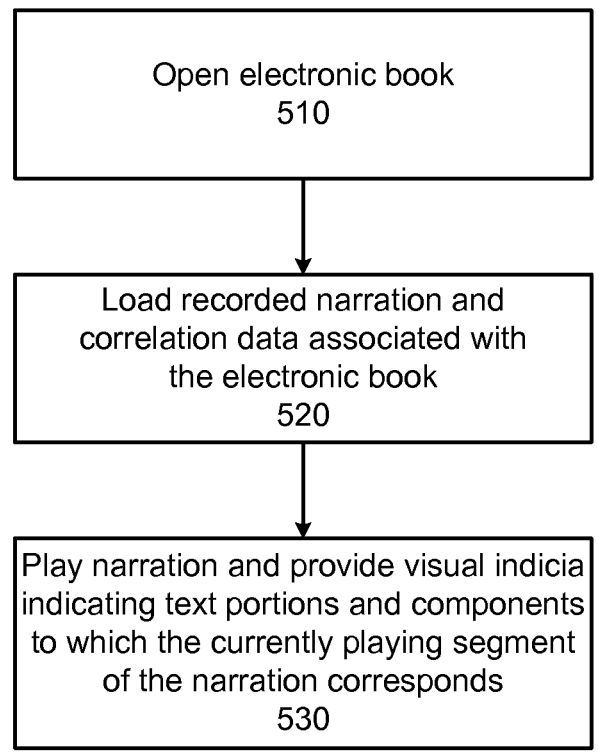
FIG. 5 is a flow chart illustrating synchronized narration playback in one embodiment.

FIG. 5 is a flow chart illustrating a method 500 used in an exemplary embodiment for the playback of a synchronized narration. A user opens an electronic book for which a synchronized narration has been previously created in an electronic book reader 210 (step 510). In one embodiment the user is queried as to whether they wish to read the book with or without the synchronized narration, in another embodiment the synchronized narration is automatically used. In further embodiments, additional parameters may be selected by the user, such as: choosing a particular narrator, choosing whether to include portions of the narration that do not correspond to the body text of the electronic book, and enabling/disabling the use of additional voices for specific characters as well as the narrator's voice. Assuming the synchronized narration is to be used, the playback module 218 of electronic book reader 210 loads the relevant recorded audio narration portions and associated correlation data that makes up the synchronized narration from the data store 116 (step 520).

Once the synchronized narration has been loaded (step 520), the playback module 218 begins playback of the synchronized narration (step 530). When a portion of the audio recording of the narration is played back by the playback module 218, the display module 212 uses the correlation data to provide visual indicia of the segment or other electronic book component to which the portion corresponds.

In some embodiments each word becomes highlighted as it is read and other components are similarly highlighted as corresponding portions of the narration are played. For example, in one embodiment, a corresponding illustration is outlined in the highlight color, a chapter break will comprise a visual marker that becomes highlighted once reached, and a repeated word will be re-highlighted in a different color to add emphasis. In a related embodiment, portions that were determined to correlate with a position in the text are indicated by a flashing icon on the display of user device 200. In other embodiments, a karaoke style bouncing ball is used to indicate the correlations between portions of the audio narration and segments of the electronic book's body text.

In some electronic books (particularly children's books) the order in which the synchronized narration should be played back is not clear. A number of different options for determining playback order are possible, including: an order specified in the electronic book, an order specified by the narrator, and user selection of components causing playback of narration corresponding with that component. For example, when the user selects a paragraph, just the portions of the synchronized narration that correlate with that paragraph will play back, and then playback will stop until the user selects another component, such as a proximal illustration. Different embodiments provide different subsets of playback order selection options, depending on factors such as the intended group of users and intended type of electronic book.

One of skill in the art will recognize that many forms of visual indicia and modes of playback are possible without deviating from the spirit and scope of the disclosure.

Exemplary Embodiment

Figure 6A:
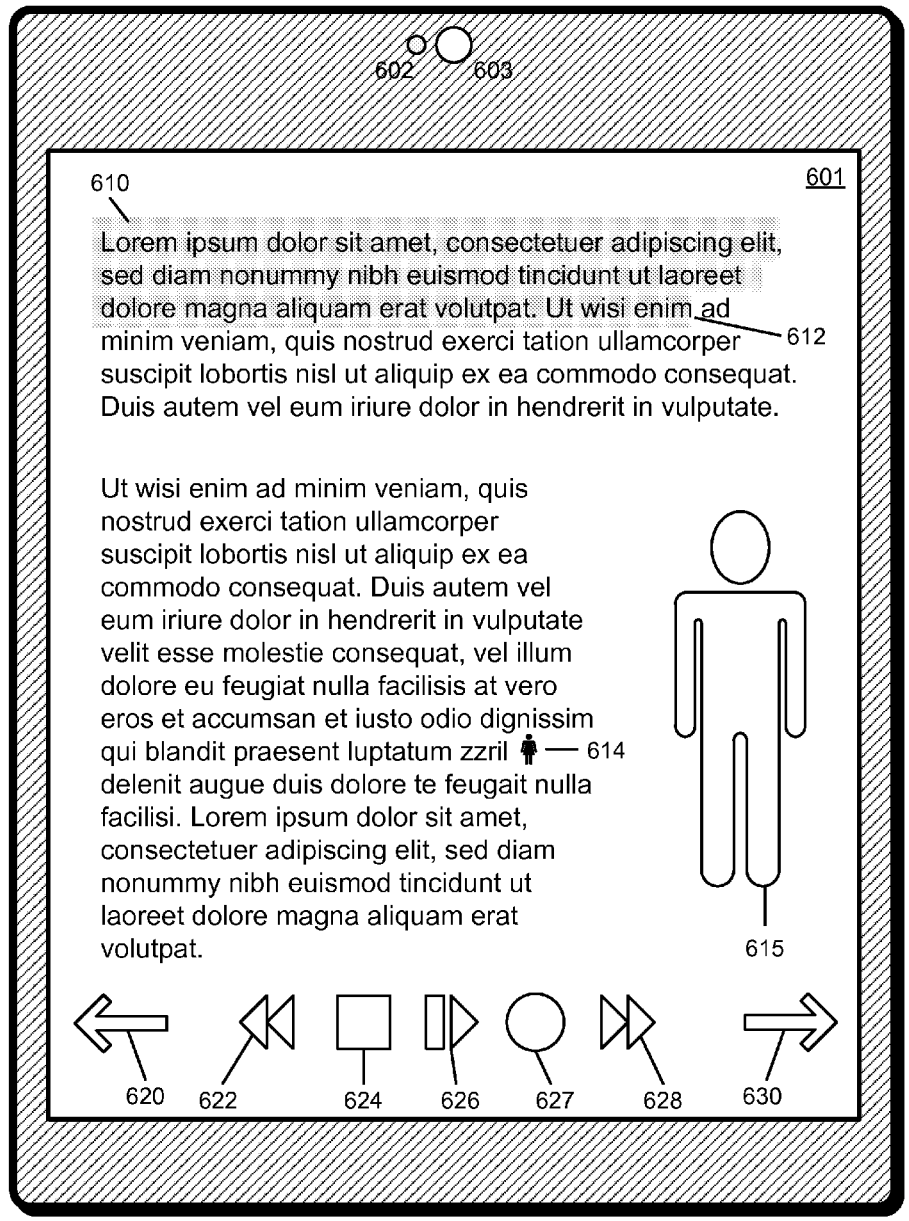
FIG. 6A illustrates a user device during synchronized narration playback, in one embodiment.

Referring now to FIG. 6A, there is shown a portable computer 600 (e.g., a tablet computer running the ANDROID™ operating system) with a touch screen 601, a microphone 602, and a front-facing camera 603. As is known to those skilled in the art, such devices currently available typically also provide rear facing cameras, accelerometers, GPS receivers, Wi-Fi and advanced cellular communications capabilities, and various other features.

In the embodiment illustrated, the portable computer 600 is running electronic book reader software 210 configured to act both as a recording device and a playback device. The reader software 210 is displaying one page of an electronic book on the touch screen 601. The page shown includes body text 610, an illustration 615, and an in-line marker 614 indicating the narration contains one or more additional utterances that were determined to correspond to that position in the body text. Some segments of the body text 610 are highlighted, indicating that portions of the synchronized narration corresponding to those segments have already been played back. The last word highlighted 612 corresponds to the portion of the synchronized narration currently being played back. In alternative embodiments, the segment corresponding to the currently playing portion of the synchronized narration is highlighted in a different manner than the segments for which the corresponding portions have already been played back, for example by using a different color, different intensity, or pulsating the highlighting.

Figure 6B:
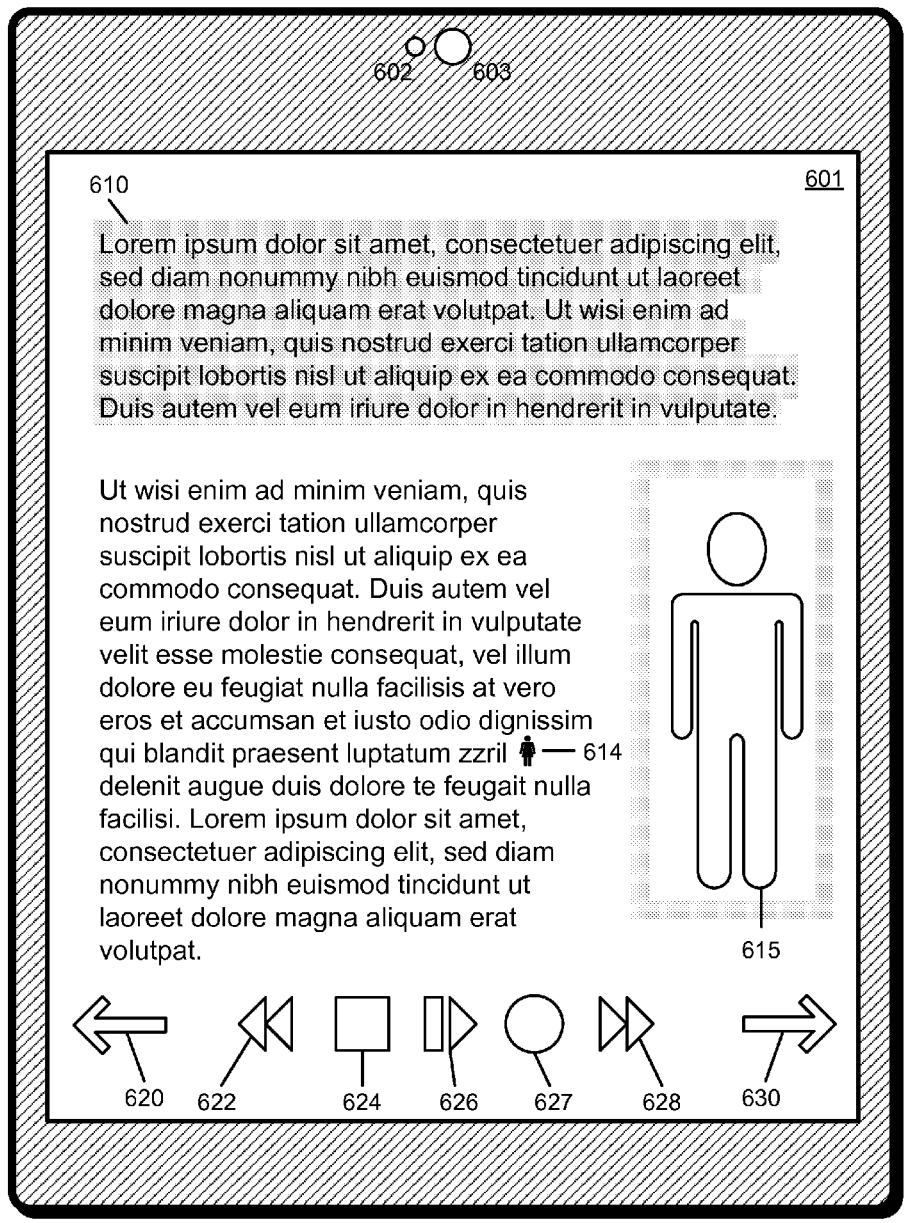
FIG. 6B illustrates the user device from FIG. 6A at a later time during playback of the synchronized narration.

FIG. 6B shows the same portable computer 600 as FIG. 6A at a later time during playback of the synchronized narration. The portions of the synchronized narration corresponding to the entire first paragraph have now been played back, as illustrated by the entire paragraph being highlighted. The illustration 615 on the page has also become highlighted, indicating that a portion of the synchronized narration that was determined to correspond to the illustration 615 is currently being played back. As described above with relation to a current segment of text, in some embodiments the highlighting of the illustration is visually distinguishable from that of previously narrated segments and components while the portion of the synchronized narration to which is corresponds to being played back.

The embodiment of book reader software 210 running on tablet computer 600 shown in FIGS. 6A and 6B also provides a number of user interface elements. The user interface elements are displayed on the touch screen 601 and interacted with by a user touching them with a finger or stylus. In other embodiments, the user interacts with the user interface elements in other manners, for example by clicking on them using a pointing device such as a mouse.

On selection, the record button 627 begins the process of recording a synchronized narration. In one embodiment, user settings selected from a preferences menu (not shown) determine where the correlation module 216 initially considers the current position to be. The user selects an option from a list of options, e.g., the beginning of the electronic book, the beginning of the current page, or a user selected position. Alternatively, the correlation module 216 may be configured to search the entire electronic book and determine where the user began their narration responsive to determining correlations between portions of the narration and segments of the body text. In other embodiments, only a subset of these options is available, for example in one embodiment the user is required to begin narrating from the beginning of the electronic book.

In one embodiment, the display module 212 provides visual indicia of the word to be read to guide the narrator's pace and make it easier for them to follow the text without making mistakes, such as skipping words or lines. The correlation module 216 monitors the recorded narration to ensure the narrator is not too far ahead or behind the visual indicia. In a related embodiment, user controls are provided with which the narrator can modify narration visual indicia preferences, such as the recommended speed of narration, the type of visual indicia, and how the system responds to the narrator being ahead or behind the visual indicia. Options for how the system responds to a narrator not being synchronized with the visual indicia include automatically adjusting the visual indicia, changing the set narration speed, and providing the user with a warning, such as a flashing red light.

The play/pause button 626 serves a dual purpose. Firstly, pressing it when the electronic book reader 210 is idle initiates playback of the synchronized narration. In one embodiment, the user may customize where playback begins from by default using the preferences menu, as described above in relation to recording. Similarly, in other embodiments only a subset of the options is made available. Secondly, if playback (or recording) is already occurring, the play/pause button 626 pauses the playback (or recording) without losing the current position. Pressing the play/pause a second time causes the playback (or recording) to resume from the current position.

In contrast, the stop button 624 halts playback without guaranteeing that the current position will be retained. In some embodiments, the stop button 624 automatically causes the current position to revert to an earlier location, such as the start of the electronic book, the start of the current chapter, the start of the current page, or the start of the current paragraph. In another embodiment the stop button 624 will retain the current position unless further criteria are met (such as the user changing page or closing the book reader 210).

In one embodiment, the display module 212 causes the page to automatically turn when the end of the current page is reached during playback or recording. In another embodiment the page is automatically turned a pre-determined time before the end of the page is reached.

The rewind 622 button causes the current position to be moved rapidly back through the body text. Similarly, the fast forward button 628 causes the current position to be moved rapidly forward through the text. In one embodiment, the visual indicia are used to indicate the location of the current position in the body text. In another embodiment, a sped-up form of the audio recording of the narration is played during fast forwarding to inform the user of the current position. When the user presses the play button 626, playback of the synchronized narration resumes from the new current position.

The forward 630 and back 620 buttons change the display on the touch screen 601 to show the next and previous pages in the electronic book respectively. In one embodiment, the user selects using the preferences menu how playback is affected by the user changing pages using the forward and back buttons 630 and 620. Options include: automatically starting playback from the beginning of the new page, automatically pausing playback, and continuing playback unaffected.

The embodiments described with reference to FIGS. 6A and 6B are exemplary and should not be considered limiting. One of skill in the art will recognize that many variations in interface and implementation are possible without deviating from the spirit and scope of the method and system disclosed.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for enabling recording and playback of narration of an electronic book including synchronized visual indicia of portion or component of the electronic book currently being narrated through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for creating a custom narration for a book, the book comprising text, the method comprising:

making an audio recording of a narrator, wherein the audio recording comprises a first portion and a second portion that immediately follows the first portion;

determining, using one or more processors, that the first portion is a reading of a first segment of the text;

generating, using one or more processors, a first correlation between the first portion of the recording and the first segment of the text;

determining, using one or more processors, that the second portion does not correspond to a second segment of the text, the second segment being a subset of the text that immediately follows the first segment;

applying, using one or more processors and responsive to determining that the second portion does not correspond to the second segment of the text, a correlation algorithm to identify a component of the book to which the second portion is likely to correspond, applying the correlation algorithm comprising:

responsive to determining the second portion is a repeat of the first portion, identifying the first segment of the text as the component of the book;
responsive to determining the second segment of text is spatially proximate to an illustration, identifying the illustration as the component of the book;
responsive to determining the first segment of the text is immediately followed by a chapter break, identifying the chapter break as the component of the book; and
responsive to determining the second portion corresponds to a third segment of the text that follows the second segment of the text, identifying the third segment of the text as the component of the book;
generating, using one or more processors, a second correlation between the second portion and the component of the book; and
storing, using one or more processors, the first and second correlations such that upon playback, the first portion is presented as corresponding to the first segment and the second portion is presented as corresponding to the component.

2. The method of claim 1, the method further comprising:
determining a third correlation between a third portion of the audio recording and the second segment of the text; and
storing the third correlation such that upon playback, the third portion is presented as corresponding to the second segment.

3. The method of claim 1, wherein the first portion and the first segment are individual words.

4. The method of claim 1, wherein the first portion and the first segment are individual syllables.

5. The method of claim 1, wherein storing the first correlation comprises adding metadata to the audio recording.

6. The method of claim 5, wherein the metadata comprises an indication of the beginning of the first portion.

7. The method of claim 1, wherein storing the first correlation comprises writing correlation data to a correlation file stored in a computer readable medium.

8. The method of claim 1, further comprising:
identifying an additional component of the electronic book that is not correlated with a portion of the audio recording;
prompting the narrator to record additional narration for the additional component of the electronic book;
recording additional narration; and
storing a third correlation between the additional narration and the additional component.

9. The method of claim 1, wherein applying the correlation algorithm comprises:
analyzing the second portion to identify a keyword therein; and
selecting the component from a plurality of candidate components based on the keyword.

10. A computer-implemented method of correlating an electronic book with a narration, the electronic book including text, the method comprising:
determining, using one or more processors, a match between a first portion of the narration and a first segment of the text;
storing, using one or more processors, instructions for presenting with emphasis the first segment simultaneously with the first portion;
determining, using one or more processors, that a second portion of the narration that immediately follows the first portion does not match a second segment of the text that immediately follows the first segment;
applying, using one or more processors and responsive to determining that the second portion does not match the second segment, a correlation algorithm to determine an association between the second portion and a component of the electronic book, applying the correlation algorithm comprising:
responsive to determining the second portion is a repeat of the first portion, identifying the first segment of the text as the component of the book;
responsive to determining the second segment of text is spatially proximate to an illustration, identifying the illustration as the component of the book;
responsive to determining the first segment of the text is immediately followed by a chapter break, identifying the chapter break as the component of the book; and
responsive to determining the second portion corresponds to a third segment of the text that follows the second segment of the text, identifying the third segment of the text as the component of the book; and
storing, using one or more processors, instructions to present with emphasis the component simultaneously with the second portion.

11. The method of claim 10, further comprising:
determining a second association between the second portion and a second component of the electronic book responsive to user input; and
overwriting the stored instructions with new instructions to present with emphasis the second component simultaneously with the second portion.

12. A computer-implemented method of presenting an electronic book in conjunction with a narration, the electronic book including text, the method comprising:
responsive to a match between a first portion of the narration and a first segment of the text, presenting the first segment with emphasis on a display in conjunction with the first portion of the narration; and
responsive to a second portion of the narration that immediately follows the first portion not matching a second segment of the text that immediately follows the first segment, determining, using one or more processors, an association between the second portion and a component of the electronic book, determining the association comprising:
responsive to determining the second portion is a repeat of the first portion, identifying the first segment of the text as the component of the book;
responsive to determining the second segment of text is spatially proximate to an illustration, identifying the illustration as the component of the book;
responsive to determining the first segment of the text is immediately followed by a chapter break, identifying the chapter break as the component of the book; and
responsive to determining the second portion corresponds to a third segment of the text that follows the second segment of the text, identifying the third segment of the text as the component of the book; and
presenting the component with emphasis on the display in conjunction with the second portion of the narration.

13. The method of claim 12, wherein presenting the first segment with emphasis occurs at substantially the same time as the first portion of the narration is read aloud by a narrator, and presenting the component with emphasis occurs at substantially the same time as the second portion of the narration is read aloud by the narrator.

14. A system for creating a custom narration for a book, the book comprising text, the system comprising:

one or more processors;
a data store, storing an electronic representation of a narration, the electronic representation including a first portion and a second portion that, during playback, immediately follows the first portion; and
a correlation module, communicatively coupled to the data store and the one or more processors, configured to determine, using the one or more processors, a first correlation between the first portion and a first segment of the text, and apply, responsive to the second portion not corresponding to a second segment of the text that immediately follows the first segment, a correlation algorithm to determine a second correlation between the second portion and a component of the book, applying the correlation algorithm comprising:
responsive to determining the second portion is a repeat of the first portion, identifying the first segment of the text as the component of the book;
responsive to determining the second segment of text is spatially proximate to an illustration, identifying the illustration as the component of the book;
responsive to determining the first segment of the text is immediately followed by a chapter break, identifying the chapter break as the component of the book; and
responsive to determining the second portion corresponds to a third segment of the text that follows the second segment of the text, identifying the third segment of the text as the component of the book.

15. The system of claim 14, wherein the correlation module is further configured to store the first and second correlations in the data store.

16. The system of claim 15, wherein the correlation module is further configured to:
determine a third correlation between the second portion and a second component of the electronic book, responsive to user input; and
overwrite the second correlation with the third correlation in the data store.

17. The system of claim 14, further comprising a recording module, communicatively coupled to the data store, configured to create the electronic representation of the narration by recording a narrator reading a subset of the text aloud.

18. The system of claim 17, further comprising a display module, communicatively coupled to the recording module, configured to prompt the narrator to record additional narration for a specific component of the book that is not correlated with a portion of the electronic representation of the narration.

19. The system of claim 14, further comprising a playback module, communicatively coupled to the data store, the playback module configured to present the first portion as corresponding to the first segment and the second portion as corresponding to the component.

20. The system of claim 14, wherein the correlation module is further configured to determine a third correlation between a third portion of the electronic representation and the second segment of the text.

21. A computer program product that comprises a non-transitory computer readable storage medium containing computer executable instructions for correlating a book with a narration, the book including text, the instructions comprising instructions to:
determine a match between a first portion of the narration and a first segment of the text;
determine that a second portion of the narration that immediately follows the first portion does not match a second segment of the text that immediately follows the first segment;
apply, responsive to determining that the second portion does not match the second segment, a correlation algorithm to determine a correlation between the second portion of the narration and a component of the electronic book, applying the correlation algorithm comprising:
responsive to determining the second portion is a repeat of the first portion, identifying the first segment of the text as the component of the book;
responsive to determining the second segment of text is spatially proximate to an illustration, identifying the illustration as the component of the book;
responsive to determining the first segment of the text is immediately followed by a chapter break, identifying the chapter break as the component of the book; and
responsive to determining the second portion corresponds to a third segment of the text that follows the second segment of the text, identifying the third segment of the text as the component of the book.

22. The computer program product of claim 21, wherein determining the correlation comprises:
analyzing the second portion to identify a keyword therein; and
selecting the component from a plurality of candidate components based on the keyword.

23. The computer program product of claim 21, wherein the instructions further comprise instructions to:
store the correlation in a data store;
determine a corrected correlation between the second portion of the narration and a second component of the electronic book responsive to user input; and
overwrite the correlation stored in the data store with the corrected correlation.

24. A computer program product that comprises a non-transitory computer readable storage medium containing computer executable instructions for presenting an electronic book in conjunction with a narration, the electronic book including text, the instructions comprising instructions to:
present a first segment of the text with emphasis in conjunction with a first portion of the narration responsive to a match between the first portion of the narration and the first segment of the text;
apply a correlation algorithm to determine an association between a second portion of the narration, that immediately follows the first portion, and a component of the electronic book, responsive to the second portion not matching a second segment of the text that immediately follows the first segment, applying the correlation algorithm comprising:
responsive to determining the second portion is a repeat of the first portion, identifying the first segment of the text as the component of the book;
responsive to determining the second segment of text is spatially proximate to an illustration, identifying the illustration as the component of the book;
responsive to determining the first segment of the text is immediately followed by a chapter break, identifying the chapter break as the component of the book; and
responsive to determining the second portion corresponds to a third segment of the text that follows the second segment of the text, identifying the third segment of the text as the component of the book; and present the component with emphasis in conjunction with the second portion of the narration.

25. The computer program product of claim 24, wherein presenting the first segment with emphasis occurs at substantially the same time as the first portion of the narration is read aloud by a narrator, and presenting the component with emphasis occurs at substantially the same time as the second portion of the narration is read aloud by the narrator.

* * * * *